United States Patent
Keutz

(10) Patent No.: US 7,096,991 B2
(45) Date of Patent: Aug. 29, 2006

(54) VEHICLE STEERING DEVICE AND SAFETY SYSTEM

(75) Inventor: Markus Keutz, Rossdorf (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 313 days.

(21) Appl. No.: 10/688,623

(22) Filed: Oct. 17, 2003

(65) Prior Publication Data

US 2004/0090321 A1 May 13, 2004

(30) Foreign Application Priority Data

Oct. 18, 2002 (DE) .......................... 202 16 068 U

(51) Int. Cl.
*B60D 1/28* (2006.01)

(52) U.S. Cl. .................... 180/271; 340/407.1

(58) Field of Classification Search ............. 180/272, 180/271; 280/731; 340/407.1, 426.31
See application file for complete search history.

(56) References Cited

U.S. PATENT DOCUMENTS

| | | | |
|---|---|---|---|
| 5,848,559 A | | 12/1998 | Harrill |
| 6,283,859 B1 * | | 9/2001 | Carlson et al. ............... 463/36 |
| 6,323,763 B1 * | | 11/2001 | Bohner et al. ............. 340/436 |
| 6,613,997 B1 * | | 9/2003 | Oster et al. ................. 200/564 |
| 2003/0141762 A1 * | | 7/2003 | Sartori et al. .............. 307/10.1 |
| 2004/0026158 A1 * | | 2/2004 | Rieth et al. ................. 180/402 |
| 2005/0030166 A1 * | | 2/2005 | Kraus et al. ............. 340/407.1 |
| 2005/0062590 A1 * | | 3/2005 | Lang et al. ................. 340/431 |

FOREIGN PATENT DOCUMENTS

| | | |
|---|---|---|
| DE | 680526 | 9/1939 |
| DE | 38 22 193 A1 | 1/1990 |
| DE | 4029657 | 3/1992 |
| DE | 296 04 485 U1 | 8/1997 |
| DE | 202 16 068 U1 | 4/2003 |
| EP | 0348691 | 6/1989 |
| EP | 0769678 | 4/1997 |
| EP | 0 856 432 A2 | 8/1998 |
| EP | 0856432 | 8/1998 |
| EP | 0958965 | 11/1999 |
| EP | 1142746 | 10/2001 |
| JP | 8268287 | 10/1996 |
| WO | WO 02/09978 | 2/2002 |

* cited by examiner

*Primary Examiner*—Faye M. Fleming
(74) *Attorney, Agent, or Firm*—Tarolli, Sundheim, Covell&Tummino LLP

(57) ABSTRACT

A vehicle steering device comprises a steering column (22) and a steering wheel with a steering wheel rim (24). Arranged inside the steering column (22) is a vibration device (26; 26'). The vibration device is designed such that it can generate a haptic signal which can be felt by a driver on a surface (28) of the steering wheel rim (24).

12 Claims, 2 Drawing Sheets

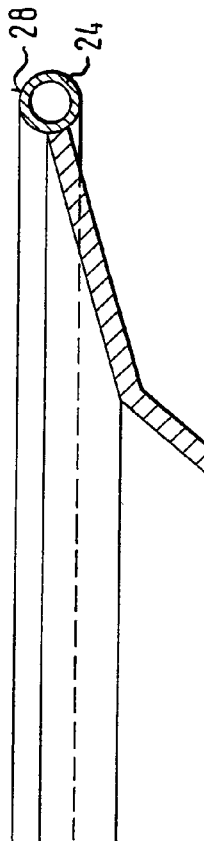
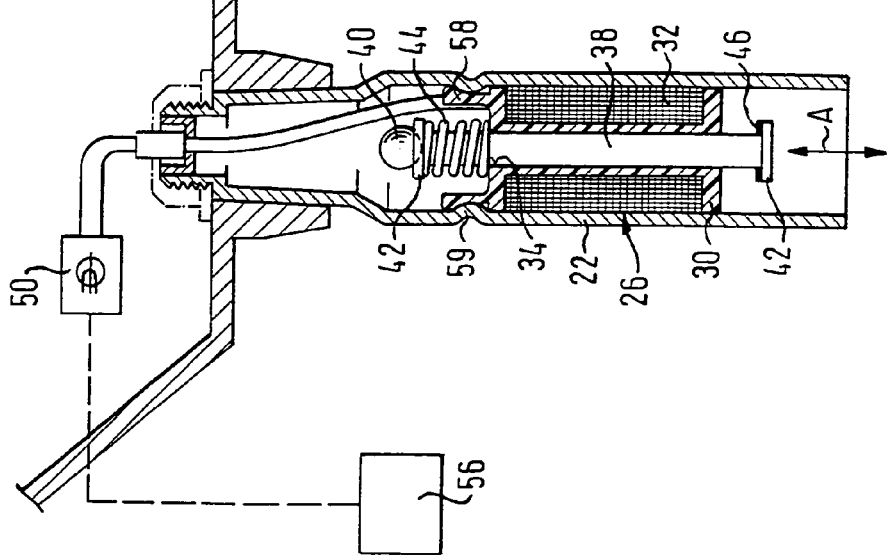
Fig. 1a
Fig. 1b

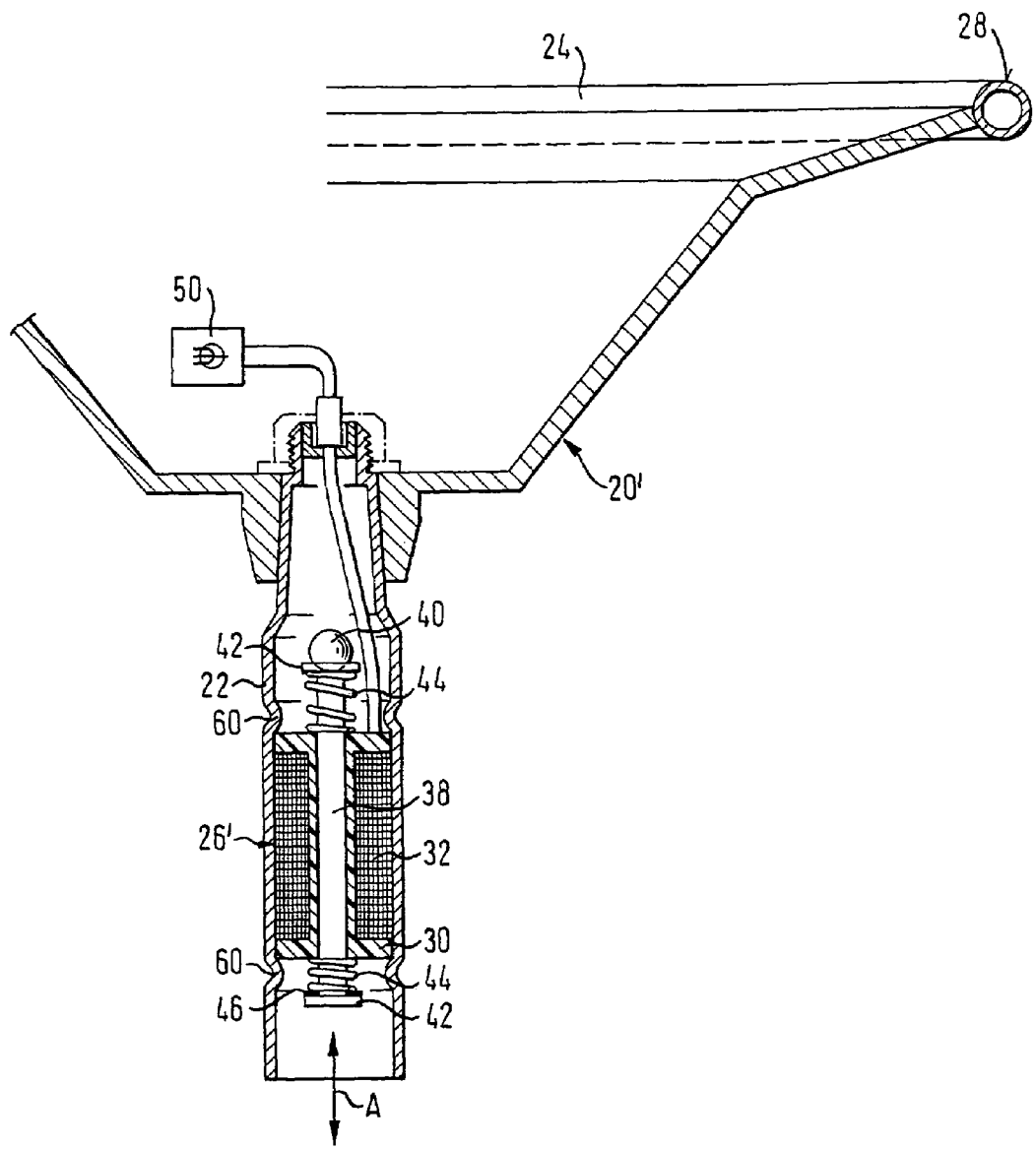

VEHICLE STEERING DEVICE AND SAFETY SYSTEM

TECHNICAL FIELD

The invention relates to a vehicle steering device including a vibration-based safety system.

BACKGROUND OF THE INVENTION

Known vehicle steering devices are composed of a steering column and a steering wheel with a steering wheel rim, and employ a safety system incorporated in the vehicle steering device.

The increasing level of irritation to which a driver is exposed in traffic leads to an increasingly higher stress and hence to an increased risk of accident. Therefore, it is expedient if the driver can be made aware of potentially dangerous situations in good time by warning signals.

Haptic signals which are given to the driver for example via the steering wheel rim, are well suited to attracting the driver's attention without distracting or startling him.

The invention proposes a possibility for generating a haptic signal in a simple manner.

BRIEF SUMMARY OF THE INVENTION

According to the invention, a vehicle steering device comprises a steering column and a steering wheel with a steering wheel rim. A vibration device is arranged inside the steering column and generates a haptic signal which can be felt by a driver on a surface of the steering wheel rim. The space inside the steering column has largely been unused hitherto and is entirely sufficient to hold such a vibration device, whereas the space inside the steering wheel or even inside the steering wheel rim is very limited on the one hand and on the other hand has to be kept free for the gas bag module which in the meantime has become part of the standard safety equipment. A vibration which is generated in the steering column transfers well to the steering wheel rim, because the latter is generally connected securely to the steering column via the spokes and the hub of the steering wheel.

In a preferred embodiment of the invention, the vibration device comprises an electromagnet with a coil and an armature arranged so as to be axially displaceable therein. The vibration is brought about by the movement of the armature in axial direction owing to the magnetic field generated by the electromagnet. Through a different addressing of the electromagnet or changing the supply current of the coil, a broad frequency spectrum of vibrations can be generated. This allows that the respectively most favorable frequencies for a particular geometry of the vehicle steering device are determined and established in a simple manner. It is possible to use different frequencies to warn of different dangerous situations.

In an embodiment of the invention, provision is made that the coil is held on a coil body and the armature extends through an axial opening of the spool body. The axial opening of the spool body can at the same time form a guide for the armature. The spool body preferably consists of a suitable plastic.

The electromagnet can be designed such that the armature can be moved relative to the coil in opposite axial directions, or also such that a movement of the armature only takes place in one axial direction.

Preferably, at least one spring is provided, which offers a force in opposition to a movement of the armature relative to the coil. The spring can provide the necessary restoring force in order to move the armature back towards the coil to generate an oscillation movement. The spring can also serve to damp the movement of the armature and to prevent rattling noises on non-actuation of the vibration device. It is possible to provide springs on one or on both axial ends of the armature.

At least one stop can be provided on the armature, which delimits an axial movement of the armature relative to the coil.

An additional mass can be arranged on the armature, which represents a further parameter for adaptation of the vibration frequency and vibration amplitude.

Preferably, the coil body is also used for fastening the vibration device in the steering column. This takes place for example in that the coil body is fastened in the steering column by pressing.

In another embodiment, provision is made that a latching element is provided on the coil body and that the steering column has a bead oriented in inward direction, with which the latching element is in engagement. In this case, the installation of the vibration device inside the steering column is particularly simple, because the coil body merely has to be pushed into the steering column so far until the latching element engages in the bead.

The vehicle steering device which was described above is preferably used in a safety system which has an electronic unit and at least one sensor connected to the electronic unit, the electronic unit being designed such that it operates the vibration device in response to a signal from the sensor. Such a safety system can be configured to be very flexible, in order to direct the driver's attention to particular things or situations.

BRIEF DESCRIPTION OF THE DRAWINGS

FIGS. 1a and 1b show a diagrammatic sectional view of a safety system of the invention with a vehicle steering device according a first embodiment; and FIG. 2 shows a diagrammatic sectional view of the vehicle steering device of the invention according to a second embodiment.

DETAILED DESCRIPTION OF THE PREFERRED EMBODIMENTS

FIG. 1a shows a safety system 10, which comprises a vehicle steering device 20, which in turn contains a steering column 22, a steering wheel connected with the steering column 22 and having a steering wheel rim 24, and also a vibration device 26 arranged inside the steering column 22. The steering wheel rim is securely connected with the steering column 22 in a known manner.

The vibration device 26 is designed such that it can generate a haptic signal, which can be felt by a driver on a surface 28 of the steering wheel rim 24. For this, the vibration device 26 comprises a coil body 30, on which a coil 32 of an electromagnet is held. The coil body has an axial opening 34, in which an armature 38 is arranged, which extends in axial direction A through the coil body 30 and can move in axial direction A relative to the coil. The extent of the armature 38 in axial direction A is so great that it projects from the coil body 30 on both sides.

The armature 38 is provided on its two axial ends with stops 42, the diameter of which is greater than the diameter of the axial opening 34 of the coil body 30. The stops 42 therefore delimit a maximum movement of the armature 38 in opposite axial directions A.

Between the upper end of the coil body 30 and the upper stop 42, a spring 44 is arranged which generates a restoring force which counteracts the force generated by the magnetic field of the coil 32 onto the armature 38. The spring can of course also be arranged at another suitable site.

On the axial side of the armature 38 which is not braked by the spring 44, a damping plate 46 is arranged between the stop 42 and the outside of the coil body 30.

In this example, at the upper end of the armature 38, an additional mass 40 is attached, the size of which represents a parameter for adjusting the vehicle steering device for specific requirements, e.g. depending on the type of vehicle.

The coil is addressed by an electronic unit 50, which also determines the type of current signal applied to the coil. In this embodiment, a unipolar signal is sufficient, because the restoring movement of the armature 38 takes place via the spring 44. The signal used for controlling the electromagnet of the vibration device 26 can be, for example, a rectangular signal or a sinusoidal signal.

In FIG. 1b the armature 38 is shown in a maximum deflected position.

The electronic unit 50 addresses the coil 32 such that the armature 38 moves in a suitable frequency and amplitude in order to generate a vibration which is able to be felt on the surface 28 of the steering wheel rim 24, by which a haptic signal can be conveyed to the driver.

The electronic unit 50 is connected to at least one sensor 56, which passes a signal to the electronic unit 50 as a function of particular parameters or situations, e.g. dangerous situations. On receiving the signal, the electronic unit 50 actuates the electromagnet of the vibration device 26 such that a movement of the armature 38 is brought about in a predetermined way and a vibration is generated which can be felt by the driver. It is possible to use signals of different intensity and frequency for different situations.

On the coil body 30, consisting of a suitable plastic, a latching element 58 is constructed, which here has the form of a recess which is delimited by one end of the coil body and a latching projection (see FIG. 1b). The inner face of the steering column 22 has a corresponding bead 59, which is in engagement with the latching element 58 and thus holds the vibration device 26 securely in the steering column 22.

To install the vibration device 26, the latter merely has to be pushed into the interior of the steering column 22, until the latching element 58 and the bead 59 are in engagement with each other.

In the second embodiment of the invention, shown in FIG. 2, springs 44 are provided, arranged on both axial ends of the armature 38 between the stop 42 and the end of the coil body 30, which springs 44 counteract a movement of the armature 38 in both axial directions A which are opposed to each other. In this case, the coil 32 is addressed by a bipolar signal, so that the electromagnet of the vibration device 26' moves the armature 38 both in positive and also in negative axial directions A. The springs 44 assist the movement of the armature 38 and at the same time provide for a damping. In addition, in turn one or more damping plates 46 can be provided.

The fastening of the vibration device 26' in the steering column 22 takes place in this case by pressing. For this, after insertion of the vibration device 26' into the steering column 22, two beads 60 are produced in the steering column 22, so that the vibration device 26' is held securely inside the steering column 22.

The respective features described in connection with the individual embodiments can also be realized in a different combination.

The invention claimed is:

1. A vehicle steering device comprising a steering column (22) and a steering wheel with a steering wheel rim (24), characterized in that inside said steering column (22) a vibration device (26; 26') is arranged for generating a haptic signal which is able to be felt by a driver on a surface (28) of said steering wheel rim (24).

2. A vehicle steering device comprising:
a steering column (22),
a steering wheel with a steering wheel rim (24), and
a vibration device (26; 26') that is arranged inside said steering column (22) for generating a haptic signal which is able to be felt by a driver on a surface (28) of said steering wheel rim (24), said vibration device (26; 26') comprises an electromagnet with a coil (32) and an armature (38) arranged therein so as to be axially displaceable.

3. The vehicle steering device according to claim 2, characterized in that said coil (32) is held on a coil body (30) and said armature (38) extends through an axial opening (34) of said coil body (30).

4. The vehicle steering device according to claim 2, characterized in that at least one spring (44) is provided, which offers a force against a movement of said armature (38) relative to said coil (32).

5. The vehicle steering device according to claim 2, characterized in that on said armature (38) at least one stop (42) is provided, which delimits an axial movement of said armature (38) relative to said coil (32).

6. The vehicle steering device according to claim 2, characterized in that said electromagnet can move said armature (38) relative to said coil (32) in opposite axial directions (A).

7. The vehicle steering device according to claim 2, characterized in that an additional mass (40) is arranged on said armature (38).

8. The vehicle steering device according to claim 2, characterized in that a coil body (30) fastened in said steering column (22) by pressing is provided.

9. The vehicle steering device according to claim 2, characterized in that a latching element (58) is constructed on a coil body (30) and that said steering column (22) has a bead (59) oriented in inward direction, with which said latching element (58) is in engagement.

10. A safety system comprising a vehicle steering device (20; 20') having a steering column (22) and a steering wheel with a steering wheel rim (24), a vibration device (26; 26') being arranged inside said steering column (22), for generating a haptic warning signal that can be felt by a driver on a surface (28) of said steering wheel rim (24), and an electronic unit (50) and at least one sensor (56) connected to said electronic unit (50), said electronic unit (50) being designed such that it activates said vibration device (26; 26') in response to a signal of said sensor (56).

11. The vehicle steering device according to claim 1, wherein the vibration device (26; 26') is arranged completely inside the steering column (22).

12. A vehicle steering device comprising a steering column (22) and a steering wheel with a steering wheel rim (24), said steering column (22) being fixed to and rotating with said steering wheel, wherein a vibration device (26; 26') is arranged inside said steering column (22) for generating a haptic signal which is able to be felt by a driver on a surface (28) of said steering wheel rim (24).

* * * * *